United States Patent [19]
Davis, Jr.

[11] 3,820,555
[45] June 28, 1974

[54] FLOW PROPORTIONAL PNEUMATIC COMPOSITE SAMPLER

[76] Inventor: Alvin Q. Davis, Jr., 16106 LaCabana, Houston, Tex. 77058

[22] Filed: Apr. 23, 1973

[21] Appl. No.: 353,558

[52] U.S. Cl. .............................................. 137/100
[51] Int. Cl. ........................................ G05d 11/035
[58] Field of Search .................. 137/98, 100, 101.19

[56] References Cited
UNITED STATES PATENTS
2,239,157   4/1941   Lowe ............................. 137/101.19
3,770,198   11/1973   Mihara ............................. 137/100 X Primary Examiner—Robert G. Nilson
Attorney, Agent, or Firm—Torres & Berryhill

[57] ABSTRACT

An illustrated embodiment of the present invention includes a fluid flow line sampling or injecting system for making injections into or taking samples from a fluid flow line at a sampling or injecting rate which is proportional to the total volume flow of fluid past a selected point in the flowline. An entirely automatic and fluid operated flow logic control system is provided which monitors the total fluid flow past a measuring point in a flowline, computes the occurrence of flow past the selected point of a predetermined quantity of fluid and operates a fluid sampling or injecting apparatus in response to the occurrence of the predetermined quantity of fluid.

15 Claims, 3 Drawing Figures

FLOW PROPORTIONAL PNEUMATIC COMPOSITE SAMPLER

BACKGROUND OF THE INVENTION

This invention relates to sampling or injecting systems for taking a sample from or injecting a volume of material into a fluid flowline. More particularly, the invention relates to systems for taking or injecting material at a rate which is proportional to the rate of fluid flow through a fluid flowline. Throughout the specification which follows, the term "fluid" is intended to include both gas and liquid. It will also be appreciated that the problems of flow proportional sampling and injection are related and that the following description of the invention can be applied to either type system without departing from the spirit of the invention.

In many oil refinery, chemical plant or pipe line applications it is desirable to periodically sample the contents of fluid flowlines. It is usually intended to sample the fluid flow in the line in such a manner that the samples provide an accurate, time related representation of the fluid that actually flows through the line. It is also necessary during processing and at other times to inject material proportionally into a fluid flowline. The sampling or injecting problem is complicated due to the fact that the flow rate of the fluid material through the line may increase or decrease during the sampling or processing interval. If such changes occur, in order to obtain flow proportional sampling or injecting, the flow rate of the fluid must be sensed and in some way related to the sampling or injecting interval. As the fluid flow rate increases, more samples (injections) are required in a given amount of time and, as the flow rate decreases, fewer samples (injections) are required.

Due to the possibility of the presence of explosive gaseous or liquid materials in the vicinity of the sampling or injecting system it is sometimes dangerous to use electrical circuits and controls for flow proportional sampling systems. In such applications, a flow proportional control system in which totally fluid powered components are utilized could be used to advantage in order to avoid the possibility of igniting any nearby flammable fluids.

In the prior art, pneumatically operated sampling systems have been provided which can sample fluid flowlines at a fixed sampling rate. While such systems do not provide the proportional flow sampling desired, they do avoid the explosion and fire dangers inherent in electrical systems. Prior art electrical systems have also been provided which monitor the fluid flow rate and operate sampling or injecting apparatus to provide a flow proportional sampling or injecting system.

SUMMARY OF THE INVENTION

Accordingly, it is an object of the present invention to provide a flow proportional fluid operated composite sampling system.

Another object of the present invention is to provide a flow proportional fluid operated injection system.

Another object of the present invention is to provide a completely pneumatically operated flow proportional sampling or injecting system which provides samples of fluids taken from a fluid flow line or injects material into a fluid flow line at a rate proportional to the volume flow of fluid through the line.

Still another object of the invention is to provide a fluid sampling or injecting system having an adjustable sampling or injecting rate.

A yet further object of the present invention is to provide a relatively economical and safe fluid sampling or injection system for use in an atmosphere which may contain flammable or explosive materials.

In accordance with the above and other objects the present invention provides a flow proportional pneumatic composite sampling or injecting system which may be utilized for taking fluid samples from a flow line or injecting materials into the flow line at a rate which is proportional to the amount of fluid flow through the line. In the system of the present invention, entirely pneumatically operated components are utilized to avoid inherent dangers present in the use of electrical circuits in an explosive atmosphere. A pneumatically operated flow metering device, which may be of the orifice type if desired, is employed for measuring the pressure drop across an orifice in a fluid flow line. A rate signal is thus obtained which is proportional to the fluid flow rate or some function of the flow rate such as the square root. The sampling device supplies an output flow proportional pneumatic signal which is input to a flow integral computer which is also pneumatically operated. The flow integral computer computes from the rate signal the total amount of fluid flow past the metering device and provides an output pneumatic signal proportional thereto to control a pneumatically operated sampling or injecting device. The latter device may either take samples from the fluid flow line or injecting material into the fluid flow line upon the completion of flow through the line of a predetermined amount of fluid as determined by the integral computer. Alternative embodiments of the flow proportional pneumatic composite sampling or injecting system are disclosed in the following detailed description. The different embodiments may utilize different pneumatic computing and logic control elements and are presented as alternative arrangements based on the same general operating principles of the invention.

The above and other objects, features and advantages of the present invention will become more apparent from the following detailed description thereof wherein reference is made to the Figures in the accompanying drawings in which:

DESCRIPTION OF THE PREFERRED EMBODIMENTS

Figure 1:
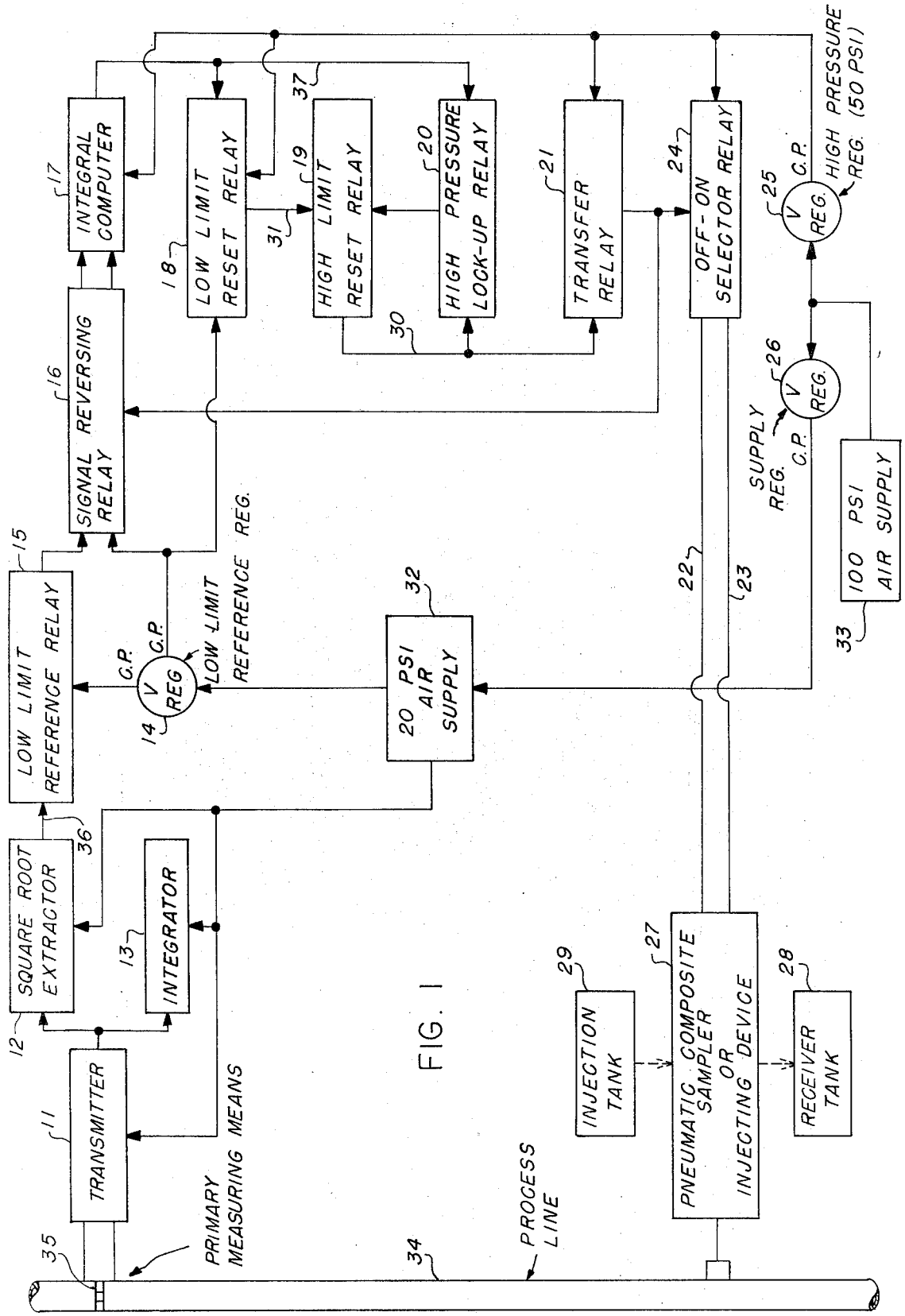
FIG. 1 is a schematic block diagram illustrating one embodiment of a fluid flow proportional pneumatic composite sampling or injecting system in accordance with the principles of the principles of the present invention.

Alternative embodiments of the present invention will be described operationally in more detail. These systems employ several types of pneumatic control, sampling and injecting, or computing elements. These system elements are of several basic types and are available commercially application usage. When connected in the manner subsequently described in the operational description of the present invention, these commercially available devices may be utilized to form a flow proportional composite sampling or injecting system in accordance with the principles of the present invention. The various systems elements utilized in the alternative embodiments of the invention described herein will first be individually described.

PNEUMATIC PRESSURE SELECTOR RELAYS

The pressure selector relay selects the higher of the two input air pressure signals and releases it directly on an output line to the next element of an instrumentation circuit. There is no retransmission which means there will be no time delay caused by this relay. These relays generally comprise two inputs a and b with a flapper type valve disposed between the two input air passages. When the input pressure at a exceeds the input pressure at b the flapper moves to allow the pressure from a to go to the output of the device shutting off the pressure from input b. Similarly, when the pressure at input b exceed the pressure at input a the reverse occurs. Such commercially available pneumatic pressure selector relays as the Moore Products Company of Spring House, Pa., Model GC-58S may be utilized in the system of the present invention for this purpose.

PNEUMATIC LIMIT PRESSURE RELAYS

Pneumatic limit setting relays generally comprise two types. The first type is a relay in which the set point or triggering point of the relay is adjusted manually by adjusting a spring loading. In this type of relay an input pneumatic signal encounters a spring loaded valve which remains in a closed position (or alternatively an open position) until the input air pressure exceeds (or falls below) a set point which is determined by the compression of the spring. When the input pressure increases (or decreases) to exceed or fall below the set point, the valve either opens or closes to permit or stop an output signal from being provided on the output line from the relay. A representative examples of this type of spring setpoint limit relay is the Moore Products Company Model GC 671 snap acting pneumatic relay.

The second type of limiting relay which is utilized in the system of the present invention is similar to the spring set point relay except that its set point is determined by a reference pneumatic signal instead of a loading spring. Additional spring biasing may also be provided on this type of relay. This pressure loaded relay is therefore a narrow band pneumatic controller which compares two pneumatic input signals. The reference signal may be applied to one side of a diaphram. The output signal is provided when the input signal exceeds the reference input signal by an amount sufficient to overcome the additional spring biasing component which may be applied to the switching diaphram. The Moore Products Company Model GC 671A and Model GC-68-5 air loaded relays are representative of this type of device. The E. W. Dahl Co. Inc., Model Mite 73 is also of this type.

AIR SUPPLY REGULATOR COMPONENTS

The air pressure supply utilized to drive the individual components of the pneumatic control system of the present invention generally supplies air pressure (of 20 and 50 PSI) from a source such as a compressor or other pneumatic pressure supply source (or bottled gas) as desired. In order to ensure consistency of operation of the component portions of the present invention, air pressure regulators such as the Moore Products Company Model GC-40 and Model GC-41 may be utilized. These pressure regulators accept an input from a variable air pressure supply source and assure a constant supply of output air or gas at the desired regulated pressure level.

NOISE FILTERS

An optional system component for filtering noise signals from flow measuring devices which may be supplied by the user (such as the flow rate sensoring device which is attached to the fluid flow line in the system to be described) may be provided. The Moore Products Company Model GC59-R Pneumatic Filter may be used for this purpose. This filter smoothes and damps erratic or too rapid variations in the air pressure signal from the fluid flow pressure sensing device so that its effect on system logic components is minimized.

SQUARE ROOT EXTRACTOR

In general, two types of pneumatic pressure detecting means may be employed to determine the rate of fluid flow through the process line being monitored by the system of the present invention. One type of rate detecting means derives an output signal which is linearly related to the flow rate. However, the more common method of detecting the fluid flow rate through a line is to measure the pressure drop across an orifice plate. This pressure drop is a square root function of the flow rate. In order to linearize this signal a pneumatic analog computer must be utilized. For this purpose a Foxboro Company pneumatic computer Model 557 Square Root Extractor may be utilized. This device produces a pneumatic output signal proportional to the square of the flow rate of the fluid in a line through an orifice as measured with a differential pressure transmitter.

FLOW INTEGRAL COMPUTER

In order to indicate when a particular volume of material has flowed past the flow rate sensing point (orifice plate) in the process line being monitored, the system utilizes a square root flow integrating computer. This computer integrates an input air signal and provides an output registered count of the cumulative input signal. The input air signal may, for example, be utilized to drive a continuously rotating turbine. The speed of the turbine is then proportional to the magnitude of the input air pressure signal. Thus the number of revolutions made by the turbine will be equal to the integral over a given period of time of the input signal. When the flow rate sensing point in the process line being monitored produces a linear output signal, a linear flow integrating computer such as the Foxboro Model 14A and 15A may be used. Alternatively, the Moore Products Company, Model GC 68 VT multifunction computing relay may be utilized for this purpose. This latter device, rather than operating on the above described principle of the rotating turbine, utilizes a pneumatic force balance mechanism to achieve the integration effect. However, the general operation insofar as the remainder of the system is the same as previously described. (i.e., an input signal is accumulated and an output signal representative of the cumulative algebraic sum of the input signal at any instant in time is provided on an output line.)

PNEUMATIC SAMPLING OR INJECTING DEVICE

A pneumatically controlled sampling or injecting device is utilized. This device routes either a volume of material to be injected into the flow line from an injection tank or extracts a sample from the flow line and conveys it to a sampling tank upon receipt of a pneumatic signal from the control logic part of the system. For this purpose, the Bristol Engineering Company Model M-4JP or Model M-4JT Chemical Sampling Device may be utilized.

SIGNAL REVERSING AND OFF-ON RELAYS

A pneumatically operated relay for changing the routing of fluid flow in the system is also used. These relays can, in response to changes in a control line signal pressure, switch the lines input to them to any of several alternative output configurations. A relay such as the Boston Pneumatic Products Company Type E-203A-AR704-0 may be used for this purpose.

PREFERRED ARRANGEMENTS OF THE SYSTEM

Referring now to FIG. 1 a first embodiment of the flow proportional pneumatic composite sampling or injecting system of the present invention is shown in block diagram form. Two air supplies are utilized in the operation of the system. A first, relatively low pressure, air supply of 20 PSI is shown at 32. A second, high pressure, air supply of 50 PSI is shown at 25. These air supplies may be compressor furnished or the system will be equally effective if operated on natural gas, nitrogen or compressed air from a tank system. It will also be appreciated that other fluids, including liquids may be employed in the system of the present invention. The low pressure air supply regulator 26, of the type previously described, regulates the air pressure for the low pressure supply. A high pressure regulator 25 regulates the high pressure air supply from the high pressure supply 33. Regulated air pressure outputs from these regulators are provided to the various components of the system as indicated in FIG. 1 to provide motive power for their operation.

The process line 34 to be monitored is equipped with an orifice type or linear flow rate measuring device at 35. A pneumatic signal transmitter 11 furnishes an output signal from this flow rate measuring device. As previously mentioned, if an orifice type device is used, this may comprise an analog pressure signal which is proportional to the square of the flow. If a linear flow rate monitor is used, a signal having a linear correspondence with the flow rate is provided from the transmitter 11. The total flow rate is monitored directly from the transmitter 11 by supplying the output signal from the transmitter 11 to a throughput integrator 13 which may integrate the linear (or square root) signal to furnish an accumulated indication of the total flow through the orifice line 34. If a square signal such as that provided by an orifice flow monitor is supplied, a square root extractor 12 is required in order to linearize the signals for further processing.

In any event, a linear signal proportional to the flow rate is presented to one input of a low limit reference relay 15 via line 36. A low limit reference regulator 14 supplies a regulated minimum signal level, which is adjustable to any standard instrumentation system requirements, to the opposite input of the low limit reference relay 15. The signal from the low limit reference regulator 14 is the lower integration input limit for a flow integral computer 17 which is utilized to determine the sampling rate in a flow proportional manner. The low limit reference relay 15, of the type previously described, automatically selects the higher input signal level of either the linearized signal on line 36 or the low limit reference regulator 14 output. The step of utilizing a low limit reference regulated signal is necessary to ensure high accuracy on very low flow rates. In the case of very low flow rates the transmitter 11 signal level may drop below the minimum reference limit useable in the flow integral computer 17. The output signal from the low limit reference relay 15 together with the low limit reference regulator 14 output signal are both supplied to a signal reversing relay 16. The signal reversing relay 16, of the type described, functions to reverse the two signals input to the proportional integral flow computer 17 upon the completion of an integration cycle as will be subsequently described.

The proportional flow integral computer 17 is designed to solve the equation $\phi = \pm \mu (1/S \int \theta \, dt)$ where $\phi$ is the corrective action, $\mu$ is the proportional mode adjustment (a fixed value normally = 1.0), $\theta$ is the percentage difference between the reference signal (low limit setpoint) and the linearized flow proportional signal (with the proper algebraic sign), $t$ is time, and $S$ is the integral mode adjustment. The flow integral computer 17 integrates between an upper and a lower limit. The computer 17 provides an output signal which is utilized in controlling the pneumatic composite sampling or injecting device 27 as will be described.

Assuming that the computer 17 initially is integrating from the lower limit toward its upper limit, the increasing integrated output signal from the computer 17 passes (via line 37) through a high pressure lock-up relay 20 and into a high limit reset relay 19. The high limit reference signal from the high limit reset relay 19 provides the upper integration limit (25 PSI) for the computer 17. When the computer output signal on line 37 reaches the set point level selected by the high limit reset relay 19, the relay 19 is triggered and supply air from the 50 PSI supply flows via the low limit reset relay 18, through line 31 and the high limit reset relay 19, into the high pressure lock-up relay 20 (via line 30). The high pressure lock-up relay 20 selects for output the higher of the two input signals supplied to it, i.e., the computer 17 output signal or the high limit signal from relay 19. Thus, while the computer 17 is integrating in an increasing manner, the relay 20 will select the computer output signal. When this signal reaches the high limit, the relay 19 is triggered. The high pressure supply air entering via lines 31 and 30 (which is always greater than the computer 17 output) will be selected by the lock-up relay 20 and will cause the high reset relay 19, the high pressure lock-up relay 20 and a transfer relay 21 to actuate until the supply air pressure is removed. When the transfer relay 21 is actuated, high pressure air from the 50 PSI supply 33 is supplied via regulator 25 to the off-on selector relay 24 which supplies a pressure signal via lines 22 or line 23 to operate the pneumatic composite sampling or injecting device 27.

The pneumatic composite sampling or injecting device 27 either injects material into the line from an injector tank 29 or draws a sample from the line and into a receiving tank 28. This only occurs when the flow integral computer 17 reaches one of its reference limits and since this only occurs when a predetermined volume of material has passed the sampling point 35 in the process line, flow proportional sampling is achieved.

When high limit reset relay 19 actuates, the transfer relay 21 also sends a signal to both the signal reversing relay 16 and the off-on selector relay 24. The operation of the off-on selector relay 24, as just described, causes the sampling or injection to take place. The signal supplied from the transfer relay 21 through the signal reversing relay 16 reverses the two input signals to computer 17, i.e., the low limit reference regulator 14 signal and the linear signal on line 36. The reversal causes the computer to integrate from its higher limit toward its lower reference limit (of 15 PSI) and the output signal from the computer 17 decreases toward the lower reference limit. The signal supplied via line 37 continues to decrease until the low limit reset relay 18 is triggered. When the low limit reset relay 18 is triggered, the supply air (50 PSI) is removed from the high limit reset relay 19 and the high selector lock-up relay 20 as well as the transfer relay 21. This causes the transfer relay 21 to actuate and produce output signals to the signal reversing relay 16 and the off-on selector relay 24 which completes the operating cycle. The computer 17 then starts to integrate from its lower limit (15 PSI) to its upper limit (25 PSI) again as previously described. It should be noted in this embodiment that, if a constant level pressure reference signal is supplied via line 36, the system will provide a constant time sampling system for making a constant time interval timer or sample measurements.

Figure 2:
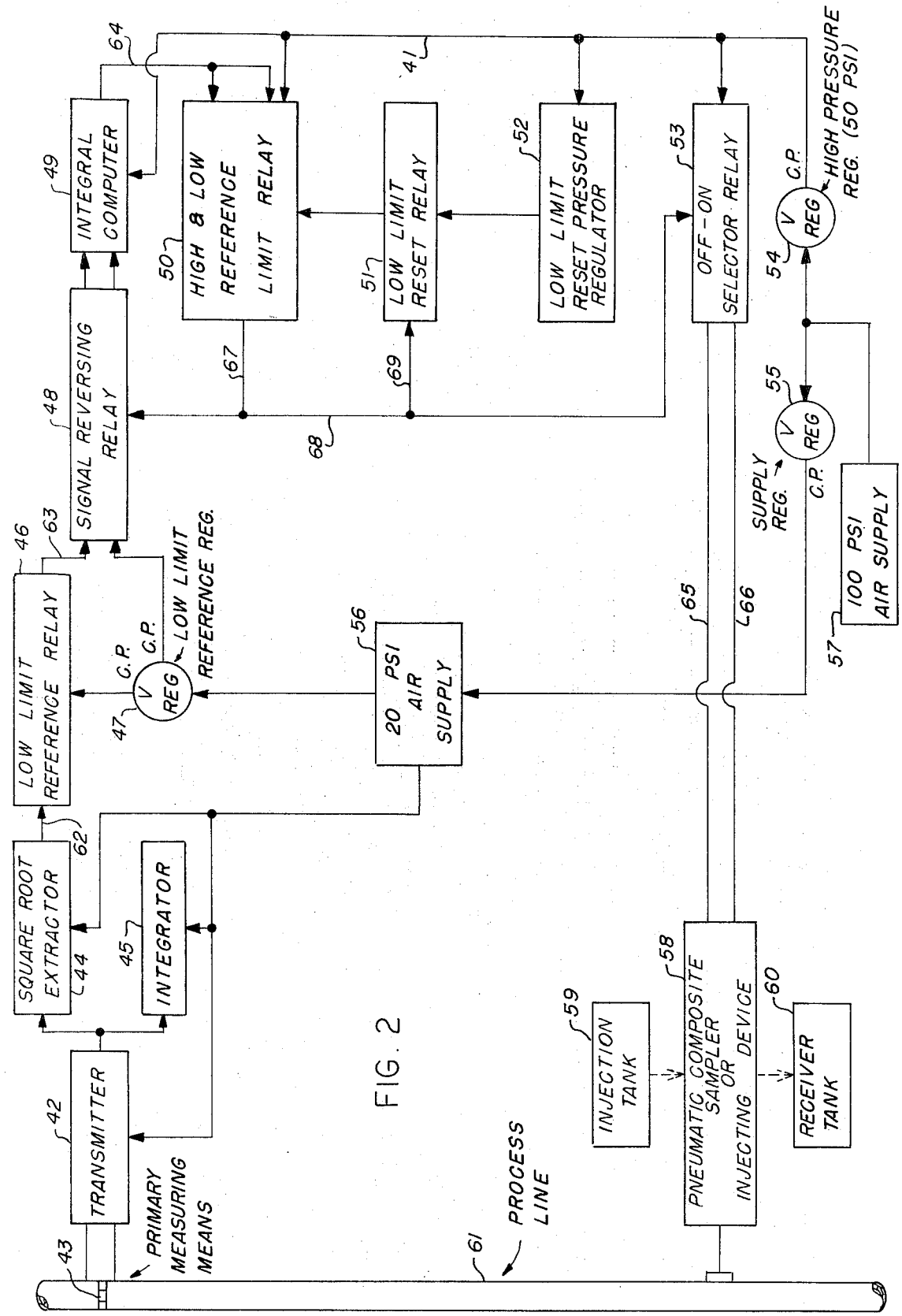
FIG. 2 is a schematic block diagram illustrating a second, alternative, embodiment of a flow proportional pneumatic composite sampling and injecting system according to the present invention.

Referring now to FIG. 2, an alternative embodiment of the present invention is shown in block diagram form. A process line 61 is monitored at a measuring point 43 by an orifice type or linear primary measuring transducer. A pneumatic signal transmitter 42 supplies an output signal which is either linear or proportional to the square of the flow in the process line 61. Again an optional square root extractor 44 is utilized if the orifice type device is used at the measuring point 43 to provide a linearized output signal on line 62. A total throughput integrator 45 is also provided as previously described with respect to FIG. 1 for monitoring the total flow past point 43 in the process line. The linearized signal on line 62 is supplied as one input to a low limit reference relay 46 which is also supplied with a second input from a low limit reference regulator 47. The low limit reference regulator 47 supplies a regulated minimum signal level which is adjustable to any standard instrumentation system requirements for the purpose of maintaining accuracy at very low flow rates, as previously described.

The low limit reference relay 46 selects either the reference signal from the low limit reference regulator 47 or the linearized signal from the input line 62, whichever is higher. The selected signal is supplied on a line 63 to one input of a signal reversing relay 48. The opposite input of the signal reversing relay 48 is supplied with a low pressure reference signal from the low limit reference regulator 47. The two outputs from the signal reversing relay 48 are supplied to the inputs of a flow integral computer 49 similar to the computer 17 previously described with respect to FIG. 1.

Assuming, at the beginning of an operating cycle, the flow integral computer 49 is integrating from its lower limit toward its upper limit, an increasing output signal is supplied on line 64. This signal is input to a high and low reference limit relay 50. The high limit reference set point, determined by the difference between the pressure regulator 54 (50 PSI as required by a composite sampling or injecting device 58) and the adjustable internal spring set point is set for 30 PSI for the purposes of this illustrative example. When the computer 49 output on line 64 reaches the high limit set point of 30 PSI, the high and low reference limit relay 50 is triggered. When the relay 50 is triggered, 50 PSI supply air provided via line 41 is routed via lines 67, 68 and 69 and causes the signal reversing relay 48 to be actuated. The low limit reset relay 51 and the on-off selector relay 53 are also actuated via line 68 at this time. When the off-on selector relay 53 is actuated, supply pressure is applied via lines 65 and 66 to operate the pneumatic composite sampling or injecting device 58. This causes either the injection of the material from an injection tank 59 or the taking of a sample from the process line 61 into the receiver tank 60 as desired.

When the signal reversing relay 48 actuates, the computer 48 starts integrating in the reverse direction. The low limit reset relay 51 (which it will be recalled is caused to actuate by the production of a signal from the high and low reference limit relay 50 via lines 67, 68 and 69) actuates to supply, now, a low limit reference signal from the low limit reset pressure regulator 52. This low limit reference signal is determined by the pressure regulator 54 output, the adjustable internal spring bias set point of the high and low reference limit relay 50 and the computer 49 output signal. The output signal of the low limit reset pressure regulator 52 is thus adjusted to yield an equivalent 15 PSI low limit set point for the high and low reference limit relay 50. As the now decreasing computer 49 output signal on line 64 reaches the 15 PSI low limit reference signal, the high and low reference limit relay 50 resets. When the high and low reference limit relay 50 resets in this manner, supply air (50 PSI) is sent to the signal reversing relay 48, the lower limit reset relay 9, and the off-on selector relay 53. This resumes the initial conditions of the system and restarts the cycle for operations in the upward integrating manner of computer 49 as just described. Additionally, when the low limit reset relay 51 actuates, the low limit reset signal is vented, as necessitated by operational characteristics of the high and low reference limit relay 50, to retrigger when the computer 49 output signal reaches the high limit of 30 PSI.

Supply air at 20 PSI for the operation of the just described system is supplied from a 20 PSI air supply 56 and supply regulator 55. Additionally, 50 PSI air is supplied via air supply 57 and the high pressure regulator 54, in the same manner as described previously for the system of FIG. 1.

Figure 3:
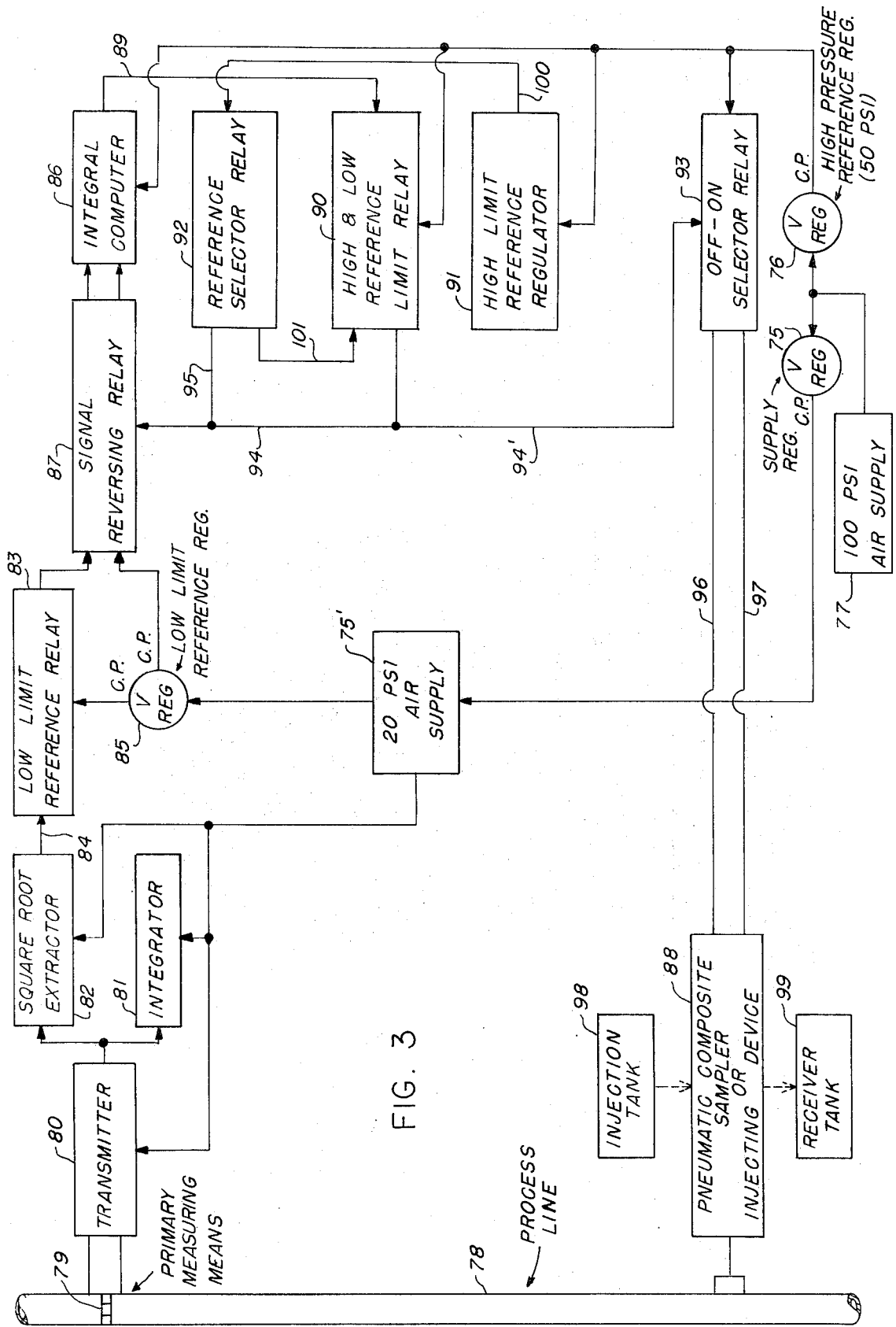
FIG. 3 is a schematic block diagram illustrating a third, alternative, embodiment of a flow proportional pneumatic composite sampling and injecting system according to the invention.

Referring now to FIG. 3, a third embodiment of the flow proportional pneumatic composite sampling or injecting system of the present invention is shown in block diagram form. Two air supplies are utilized in the operation of the system. A first, relatively low pressure, air supply regulator of 20 PSI ± 2 PSI is shown as 75. A second, higher pressure, air supply regulator of 50 PSI ± 2 PSI is shown 76. These air suppliers may be compressor furnished or the system will be equally effective if operated on natural gas, nitrogen or compressed air from a tank system. It will also be appreciated that other fluids, including liquids may be employed in the system of the present invention. The low pressure air supply regulator 75, of the type previously described, regulates the air pressure for the low pressure supply. A high pressure regulator 76 regulates the high pressure air supply of 50 PSI from the high pressure supply 77. Regulated air pressure output from these regulators are provided to the various components of the system as indicated in FIG. 3 to provide motive power for their operation. Supply air of 20 PSI for the operation of the system is supplied from a 20 PSI air supply 75' and supply regulator 75.

The process line 78 to be monitored is equipped with an orifice type or linear flow rate measuring device at 79. A pneumatic signal transmitter 80 furnishes an output signal from this flow rate measuring device 79. As previously mentioned, if an orifice type device is used, this may comprise an analog pressure signal which is proportional to the square root of the flow. If a linear flow rate monitor is used, a pneumatic signal having a linear correspondence with the flow rate is provided from the transmitter 80. The total flow rate is monitored directly from the transmitter 80 by supplying the output signal from the transmitter 80 to an integrator 81 which may integrate the linear (or square root) signal to furnish an accumulated indication of the total flow through the orifice line 79. If a square root signal such as that provided by an orifice type flow monitor is supplied, a square root extractor 82 is required in order to linearize the signal for further processing.

In any event, a linear signal proportional to the flow rate is presented to one input of a low limit reference relay 83 via line 84. A low limit reference regulator 85 supplies a regulated minimum signal level, which is adjusted to any standard instrumentation system requirements, to the opposite input of the low limit reference relay 83. The signal from the low limit reference regulator 85 is the low integration input limit for the flow integral computer 86 which is utilized to determine the sampling rate in a flow proportional manner. The low limit reference relay 83, of the type previously described, automatically selects the higher input signal level of either the linearized signal on line 84 or the low limit reference regulator 85 output. The step of utilizing a low limit reference regulated signal is necessary to ensure high accuracy on very low flow rates. In the case of very low flow rates, the transmitter 80 signal may drop below the minimum reference limit usable in the flow integral computer 86. The output signal from the low limit reference relay 83 together with the low limit reference regulator 85 output signal are both supplied to a signal reversing relay 87. The signal reversing relay 87, of the type previously described, functions to reverse the two signals input to the integral flow computer 86 upon the completion of an integration cycle as will be subsequently described.

The flow integral computer 86 is designed to solve the equation $$\phi = \pm \mu \left( 1/S \int \theta \, dt \right)$$

where $\phi$ is the output action, $\mu$ is the proportional mode adjustment (fixed value normally 1.0), $\theta$ is the percentage difference between the reference signal (low limit setpoint) and the linearized flow proportional signal (with the proper algebraic sign), $t$ is time and $S$ is the integral mode adjustment. The flow integral computer 86 integrates between an upper and a lower limit. The computer 86 provides an output signal which is utilized in controlling the pneumatic composite sampling or injecting device 88 as will be described.

Assuming that the computer 86 initially is integrating from the upper limit toward its lower limit, the decreasing integrated output signal from the computer 86 passes (via line 89) into a high and low reference limit relay 90. The high limit reference signal from the high limit reference regulator 91 passes through the reference selector relay 92 and provides the upper integration limit of 45 PSI for the computer 86. The upper integration limit is fully adjustable from 20 PSI to 45 PSI via the high limit reference regulator 91. The lower integration limit for the integral computer is determined by an internal biasing spring in the high and low reference limit relay 90. The lower integration limit, for the purpose of this illustration, is set for 15 PSI. When the computer 86 output signal on line 89 reaches the lower reference limit of 15 PSI, the high and low reference limit relay 90 is triggered and supply air from the 50 PSI supply flows through line 94' into the off-on selector relay 93, via line 94 into the signal reversing relay 87, and via line 95 into the reference selector relay 92.

When the off-on selector relay 93 is actuated, high pressure air of 50 PSI from the supply 77 is conducted via regulator 76 to the off-on selector relay 93 which supplies a pressure signal via line 96 or 97 to operate the pneumatic composite sampling or injecting device 88. The pneumatic composite sampling or injecting device 88 either injects material into the line from an injection tank 98 or draws a sample from the line and into a receiving tank 99. This only occurs when the flow integral computer 86 reaches one of its reference limits and since this only occurs when a predetermined volume of material has passed the sampling point 79 in the process line, flow proportional sampling or injecting is achieved.

Also, when the high and low reference limit relay 90 actuates, the signal supplied to the signal reversing relay 87 via line 94 causes the reversal of the two input signals to the computer 86, i.e., the low limit reference regulator signal and the linear signal on line 84. The reversal causes the computer 86 to integrate from its lower limit of 15 PSI toward its upper reference limit of 45 PSI and the output signal from the computer 86 now increases toward the upper reference limit. The signal supplied via line 89 continues to increase until the high and low reference limit relay 90 upper limit is reached and the relay 90 is triggered.

Finally, when the computer output on line 89 reaches the lower integration limit of 15 PSI and the high and low reference limit relay 90 triggers, 50 PSI supply air flow through line 95 into the reference selector relay 92 causing the reference selector relay 92 to actuate. The reference selector relay 92 then blocks in the vent from the internal reference chamber in the high and low reference limit relay 90 and allows the high limit reference regulator 91 signal supplied via line 100 to flow through the reference selector relay 92 and into the internal reference chamber in the high and low reference limit relay 90 via line 101. As the high limit reference regulator 91 signal (45 PSI) is now greater than the computer 86 output signal (15 PSI), the high and low limit reference limit relay 90 will remain triggered until the computer 86 output signal reaches 45 PSI. When the computer 86 output signal increases to 45 PSI and the high and low reference limit relay 90 is again triggered, supply air of 50 PSI is removed from the off-on selector relay 93, the signal reversing relay 87, and the reference selector relay 92.

This completes the operating cycle and the computer 86 then starts to integrate from its upper limit of 45 PSI to its lower limit of 15 PSI again as previously described. It should be noted in this embodiment that, if a constant level pressure reference signal is supplied via line 84, the system will provide a constant time sampling system for making a constant time interval timer or sample measurements.

While three separate embodiments of the system of the present invention have been shown, it will be understood that the system components used in all three systems may be conventionally available components as previously described. The synergistic interaction of these components when connected in the manner described creates a flow proportional pneumatic composite sampling or injecting control system in accordance with the concepts of the invention.

It will be appreciated by those skilled in the art that the above description may make other alternative embodiments of the invention apparent. It is the aim in the appended claims to cover all such changes or modifications as fall within the true spirit and scope of the invention.

I claim:

1. A fluid operated system for taking from or injecting into a fluid flowline quantities of material at a sampling or injecting rate which is proportional to the volume flow of fluid material in the flowline, comprising:

a. means for measuring the fluid flow rate past a preselected point in a fluid flowline and generating a pressure flow rate signal functionally related thereto;
   b. fluid operated integrating means for integrating said pressure flow rate signal to derive a pressure volume signal representative of the volume flow of fluid past said preselected point in said flowline; and
   c. fluid operable means responsive to said pressure volume signal for taking from or injecting into said flowline a quantity of material.

2. A system as defined in claim 1 and further including:

a. fluid operated means for automatically establishing upper and lower integrating limits for said integrating means; and
   b. means for automatically reversing said upper and lower integrating limits upon the occurrence of flow of a selected quantity of fluid material past said preselected point.

3. A system as defined in claim 2 and further including means for detecting the occurrence of said flow rate signal reaching said upper integrating limit and for generating a pressure upper limit output signal upon said occurrence.

4. A system as defined in claim 2 and further including means for detecting the occurrence of said pressure volume signal reaching said lower integrating limit and for generating a pressure lower limit output signal upon said occurrence.

5. A system as defined in claim 2 and further including means for automatically selecting either a constant level fluid pressure signal or said pressure flow rate signal, whichever is higher, as input to said integrating means.

6. A system as defined in claim 1 wherein said means for measuring the fluid flow rate past a preselected point in a fluid flowline includes an orifice type flow rate measuring means.

7. A system as defined in claim 6 and further including fluid operable means for linearizing the pressure flow rate signal to produce an output signal linearly related to the fluid flow rate past said preselected point.

8. A system as defined in claim 1 and further including second means for continuously integrating the pressure flow rate signal to provide a continuous record of the total throughput volume flow of fluid past said preselected point in said fluid flowline.

9. A system as defined in claim 1 and further including means for providing regulated fluid operating pressures for fluid operated means in said system.

10. A system as defined in claim 1 and further including means for providing a constant level pressure input signal to said integrating means, thereby providing a constant time fluid flowline sampling or injecting system.

11. A fluid operated control system for controlling a fluid operable sampling or injecting apparatus situated at a selected point in a fluid flowline to either draw material samples or inject material into the flowline in a prescribed manner, comprising:

a. means for obtaining a pressure signal functionally related to the fluid flow rate past a preselected point in a fluid flowline;
   b. means for integrating said pressure signal related to said flow rate to obtain a second pressue signal functionally related to the volume of fluid passing said preselected point in said fluid flowline; and
   c. means for comparing said second pressure signal with an upper and a lower pressure limit and for, when said second signal reaches either of said limits, generating a third pressure output signal to operate said fluid operable sampling or injecting apparatus.

12. The system of claim 11 wherein said means for comparing said second pressure signal with an upper and a lower pressure limit includes means for reversing said pressure limits upon the occurrence of said second pressure signal reaching either of said limits.

13. A control system as defined in claim 11 and further including means for comparing said pressure signal functionally related to the fluid flow rate past a preselected point with a fixed lower pressure limit and for providing on the basis of this comparison, either said flow rate pressure signal or said fixed lower pressure limit as input to said means for integrating said flow rate pressure signal.

14. A control system as defined in claim 11 and further including means for providing regulated fluid pressure to each means of said system to provide motive power for their operation.

15. A control system as defined in claim 11 and further including means for providing a constant level pressure input signal to said integrating means, thereby providing a constant time fluid flowline sampling or injecting control system.

* * * * *